(12) United States Patent
Prasad et al.

(10) Patent No.: US 12,536,295 B2
(45) Date of Patent: Jan. 27, 2026

(54) SYSTEM AND METHOD FOR ANALYZING AND TESTING PRIVACY OF MOBILE APPLICATIONS

(71) Applicant: TALENT UNLIMITED ONLINE SERVICES PRIVATE LIMITED, Delhi (IN)

(72) Inventors: Rahul Prasad, Gurugram (IN); Ankit Prasad, Gurugram (IN)

( * ) Notice: Subject to any disclaimer, the term of this patent is extended or adjusted under 35 U.S.C. 154(b) by 405 days.

(21) Appl. No.: 18/091,996

(22) Filed: Dec. 30, 2022

(65) Prior Publication Data

US 2023/0222224 A1 Jul. 13, 2023

(30) Foreign Application Priority Data

Dec. 31, 2021 (IN) .............................. 202111062251

(51) Int. Cl.
| | | |
|---|---|---|
| G06F 11/00 | (2006.01) | |
| G06F 12/14 | (2006.01) | |
| G06F 12/16 | (2006.01) | |
| G06F 21/57 | (2013.01) | |
| G08B 23/00 | (2006.01) | |

(52) U.S. Cl.
CPC ...... *G06F 21/577* (2013.01); *G06F 2221/033* (2013.01)

(58) Field of Classification Search
CPC ..................................................... G06F 21/577
USPC ............................................................ 726/25
See application file for complete search history.

(56) References Cited

U.S. PATENT DOCUMENTS

| | | | |
|---|---|---|---|
| 2014/0129457 A1* | 5/2014 | Peeler .................. | G06Q 30/018 705/317 |
| 2018/0288062 A1* | 10/2018 | Goyal ................. | H04L 63/0281 |
| 2019/0227917 A1* | 7/2019 | Henry ................. | G06F 11/3684 |

* cited by examiner

*Primary Examiner* — Jeffrey C Pwu
*Assistant Examiner* — Samuel Ambaye
(74) *Attorney, Agent, or Firm* — Goudie PLLC

(57) ABSTRACT

A method for testing and analyzing privacy of a mobile application is disclosed. The method includes displaying (203)/(502) a list of mobile devices connected to a privacy testing system; enabling (202) a user to select a target mobile application for carrying out a privacy analysis and testing; checking (204)/(504) if an android debug bridge (ADB) command line tool is enabled on the mobile device; employing (215)/(508) an SSL unpinning process if the mobile application is embedded with SSL pinning; scanning (225)/(510) one or more encryptions and one or more obfuscations used by the target mobile application; monitoring (220)/(514) one or more file access requests generated by the target mobile application and generating (230)/(516) an analysis testing report of the target mobile application.

18 Claims, 12 Drawing Sheets

SYSTEM AND METHOD FOR ANALYZING AND TESTING PRIVACY OF MOBILE APPLICATIONS

CROSS-REFERENCE TO RELATED APPLICATIONS

The embodiments herein claim the priority of the Provisional Patent Application (PPA) with serial number IN 202111062251 and title "A SYSTEM AND METHOD FOR ANALYZING AND TESTING PRIVACY OF MOBILE APPLICATIONS", filed at Indian Patent Office on Dec. 31, 2021, and the contents of which are included entirely as reference herein.

BACKGROUND

Technical Field

The embodiments herein are generally related to a field of a mobile application. The embodiments herein are particularly related to a system and a method for analyzing and testing privacy of mobile applications. The embodiments herein are more particularly related to a system and a method of dynamically hooking to track file requests made by a Mobile Application. In specific, the embodiments herein provide a system and a method for receiving comprehensive information about various privacy techniques, accessed files, used URLs, and APIs utilized by the Mobile Application.

Description of the Related Art

Smartphones have become a major part of human day to day life. The smartphones are used to ease every aspect of human lives through one or more appropriate mobile applications. The mobile applications of a smart phone could be in any aspect including, but not limited, banking, social networking, financial apps, communication, gaming, and entertainment. For every desktop or web application an alternate mobile application is available with just a click away. As the number of mobile applications that a user access on his/her phone increases, the number of mobile applications that accesses user data also increases. With this huge number of applications, data security is an important issue. There is always a risk of the applications that may affect or leak sensitive data related to the mobile device, credit or debit card information, location information and so on. Some mobile apps go to wide lengths to ensure that even the owner of the mobile device can never see the content of the app's requests and/or communications with one or more application servers.

Hence, there is a gap in terms of visibility that helps analyse aspects of the mobile device such as security research, privacy analysis and debugging to control the data communication of mobile device. The existing methods includes systems to directly intercept HTTPS requests, the inspection tools like HTTP Toolkit, which allows the user to automatically intercept HTTPS from mobile devices for inspection, testing & mocking. However, the existing systems and methods do not provide a tool which gives a comprehensive information about the various privacy techniques adapted by the mobile applications. Also, the existing methods do not provide information on files accessed, bypass SSL pinning certificates employed and monitor file uploads and downloads by each of the mobile applications in the mobile device.

Hence, there is a long-felt need for a system and a method for analyzing and testing privacy of mobile applications based on dynamic hooking method to track file requests made by the mobile application.

The above-mentioned shortcomings, disadvantages and problems are ad dressed herein, and which will be understood by reading and studying the following specification.

OBJECTIVES OF THE EMBODIMENTS HEREIN

A primary object of the embodiments herein is to develop a system and a method for analyzing and testing privacy of at least one mobile application of a mobile device.

Another object of the embodiments herein is to provide a system and a dynamic hooking method to track file requests made by at least one mobile application.

Yet another object of the embodiments herein is to provide systems and methods for the Secure Sockets Layer (SSL) unpinning of at least one mobile application.

Yet another object of the embodiments herein is to provide a system and a method to patch the android application with a dynamic instrumentation agent.

Yet another object of the embodiments herein is to provide a system and a method to execute monkey process or allow user to provide inputs to test the behaviour of at least one mobile application during the process.

The objects disclosed above will be realized and achieved at least by the elements, features, and combinations particularly disclosed in the detailed description that follows. The objects disclosed above have outlined, rather broadly, the features of the embodiments herein in order that the detailed description that follows may be better understood. The objects disclosed above are not intended to determine the scope of the claimed subject matter and are not to be construed as limiting of the embodiments herein. Additional objects, features, and advantages of the embodiments herein are disclosed below. The objects disclosed above, which are believed to be characteristic of the embodiments herein, both as to its organization and method of operation, together with further objects, features, and advantages, will be better understood and illustrated by the technical features broadly embodied and described in the following description when considered in connection with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In an aspect a method for testing and analyzing privacy of a mobile application is provided. The method includes displaying a list of a plurality of mobile devices connected to a privacy testing system and enabling a user to select a target mobile application for carrying out a privacy analysis and testing. The method further includes checking if an android debug bridge (ADB) command line tool is enabled on the mobile device. The method further includes checking if the mobile application is embedded with Secure Socket Layer (SSL) pinning. The method further includes employing an SSL unpinning process if the mobile application is embedded with SSL pinning. The method further includes scanning one or more encryptions and one or more obfuscations used by the target mobile application. The method further includes intercepting hypertext transfer protocol (http) and one or more http calls made by the target mobile application. The method further includes monitoring one or more file access requests generated by the target mobile application and generating an analysis testing report of the target mobile application.

According to an embodiment, the root privileges of the mobile device upon ADB command line tool being available on the mobile device further includes saving a processor architecture type of the mobile device in the privacy testing system upon mobile device being rooted. The method further includes selecting a native dynamic instrumentation binary based on the processor architecture type and pushing the native dynamic instrumentation binary to the mobile device. The method further includes executing the instrumentation binary and initiating an instrumentation server. The method further includes displaying a plurality of mobile applications included in the mobile device and selecting the target mobile application of the privacy is to be tested by the user and saving a software package name of the mobile application to be inserted in various stages of the method. The package name is used as an identifier for the mobile application.

According to an embodiment, checking if the mobile application is embedded with SSL pinning further includes patching the mobile application with a dynamic instrumentation agent if the mobile application is not embedded with SSL pinning. The method further includes injecting a script inside the mobile application. The method further includes setting up a reverse proxy between the mobile device and the server and initiating a monkey process on the mobile application or prompting user to provide manual inputs.

According to an embodiment, the method further includes generating a report of the issues and errors faced during execution of the unpinning methods if none of the SSL unpinning methods works or the target application crashes multiple times while trying the same.

According to an embodiment, generating an analysis testing report of the target mobile application further includes saving one or more unique URLs and one or more application programming interface (API) endpoints in a memory. The method further includes saving one or more encryptions and ciphering used during scanning for encryptions and obfuscations in the memory. The method further includes saving a location of the file during monitoring one or more file access requests generated by the target mobile application. The method further includes waiting for the completion of monkey process and stopping the code injection and sending a command from the system to the mobile device to stop the dynamic instrumentation server.

According to an embodiment, the SSL unpinning method further includes the method further includes disabling SSL pinning by hooking into the classes implementing one of the: cert/certificate/SSL pinning upon direct implementation or without obfuscation. The method further includes preventing the SSL unverified exception using generic hook in case of obfuscation. The method further includes trying to catch the class and method implementing SSL pinning and patching to disable SSL pinning.

According to an embodiment, the native dynamic instrumentation binary is the process of modifying the instructions of a binary program of the mobile device while it executes.

According to an embodiment, to check the SSL pinning, the system is configured to use an encryption and obfuscation identifying library to determine the encryptions and obfuscations used in the mobile application.

According to an embodiment, setting up a reverse proxy between the mobile device and the server further includes requesting mobile device to send data to the server using android application. The method further includes intercepting the request from the mobile device and response from server by the reverse proxy sitting between the mobile device and server. The method further includes tracing the application programming interface (API) calls happening between the mobile device and respective server. The method further includes hosting the reverse proxy on the system. The proxy address provided by the system consists of an IP address and port and forcing the mobile device to connect to the same using android debug bridge (ADB) commands.

In another aspect a system for testing and analyzing privacy of a mobile application is provided. The system includes a memory for storing one or more executable modules and a processor for executing the one or more executable modules for phonetic-based transliteration. The one or more executable modules includes a displaying module for displaying a list of a plurality of mobile devices connected to a privacy testing system and enabling a user to select a target mobile application for conducting privacy analysis and testing of the target mobile application. The executable modules further include a ADB module for checking if an android debug bridge (ADB) command line tool is enabled on the mobile device. The executable modules further include a checking module for checking if the mobile application is embedded with Secure Socket Layer (SSL) pinning. The executable modules further include an SSL module for employing an SSL unpinning process if the mobile application is embedded with SSL pinning. The executable modules further include a scanning module for scanning one or more encryptions and one or more obfuscations used by the target mobile application. The executable modules further include an intercepting module for intercepting hypertext transfer protocol (http) and one or more http calls made by the target mobile application. The executable modules further include a monitoring module for monitoring one or more file access requests generated by the target mobile application and a generation module for generating an analysis testing report of the target mobile application.

According to an embodiment, the ADB module is further configured for saving a processor architecture type of the mobile device in the privacy testing system upon mobile device being rooted, selecting a native dynamic instrumentation binary based on the processor architecture type and pushing the native dynamic instrumentation binary to the mobile device, executing the instrumentation binary and initiating an instrumentation server, displaying a plurality of mobile applications included in the mobile device and selecting the target mobile application of the privacy is to be tested by the user and saving a software package name of the mobile application to be inserted in various stages of the method. The package name is used as an identifier for the mobile application.

According to an embodiment, the checking module is further configured for patching the mobile application with a dynamic instrumentation agent if the mobile application is not embedded with SSL pinning, injecting a script inside the mobile application, setting up a reverse proxy between the mobile device and the server and initiating a monkey process on the mobile application or prompting user to provide manual inputs.

According to an embodiment, the system further includes generating a report of the issues and errors faced during execution of the unpinning methods if none of the SSL unpinning methods works or the target application crashes multiple times while trying the same.

According to an embodiment, the generation module is further configured for saving one or more unique URLs and one or more application programming interface (API) endpoints in a memory, saving one or more encryptions and ciphering used during scanning for encryptions and obfuscations in the memory, saving a location of the file during monitoring one or more file access requests generated by the target mobile application, waiting for the completion of monkey process and stopping the code injection and sending a command from the system to the mobile device to stop the dynamic instrumentation server.

According to an embodiment, the SSL unpinning method further includes disabling SSL pinning by hooking into the classes implementing one of the: cert/certificate/SSL pinning upon direct implementation or without obfuscation, preventing the SSL unverified exception using generic hook in case of obfuscation, trying to catch the class and method implementing SSL pinning and patching to disable SSL pinning.

According to an embodiment, the native dynamic instrumentation binary is the process of modifying the instructions of a binary program of the mobile device while it executes.

According to an embodiment, to check the SSL pinning, the system is configured to use an encryption and obfuscation identifying library to determine the encryptions and obfuscations used in the mobile application.

According to an embodiment, the checking module is further configured for requesting mobile device to send data to the server using android application, intercepting the request from the mobile device and response from server by the reverse proxy sitting between the mobile device and server, tracing the application programming interface (API) calls happening between the mobile device and respective server, hosting the reverse proxy on the system. The proxy address provided by the system consists of an IP address and port and forcing the mobile device to connect to the same using android debug bridge (ADB) commands.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments herein are shown in the drawings. However, the embodiments herein is not limited to the specific methods and components disclosed herein. The description of a method step or a component referenced by a numeral in a drawing is applicable to the description of that method step or component shown by that same numeral in any subsequent drawing herein.

Figure 1A:
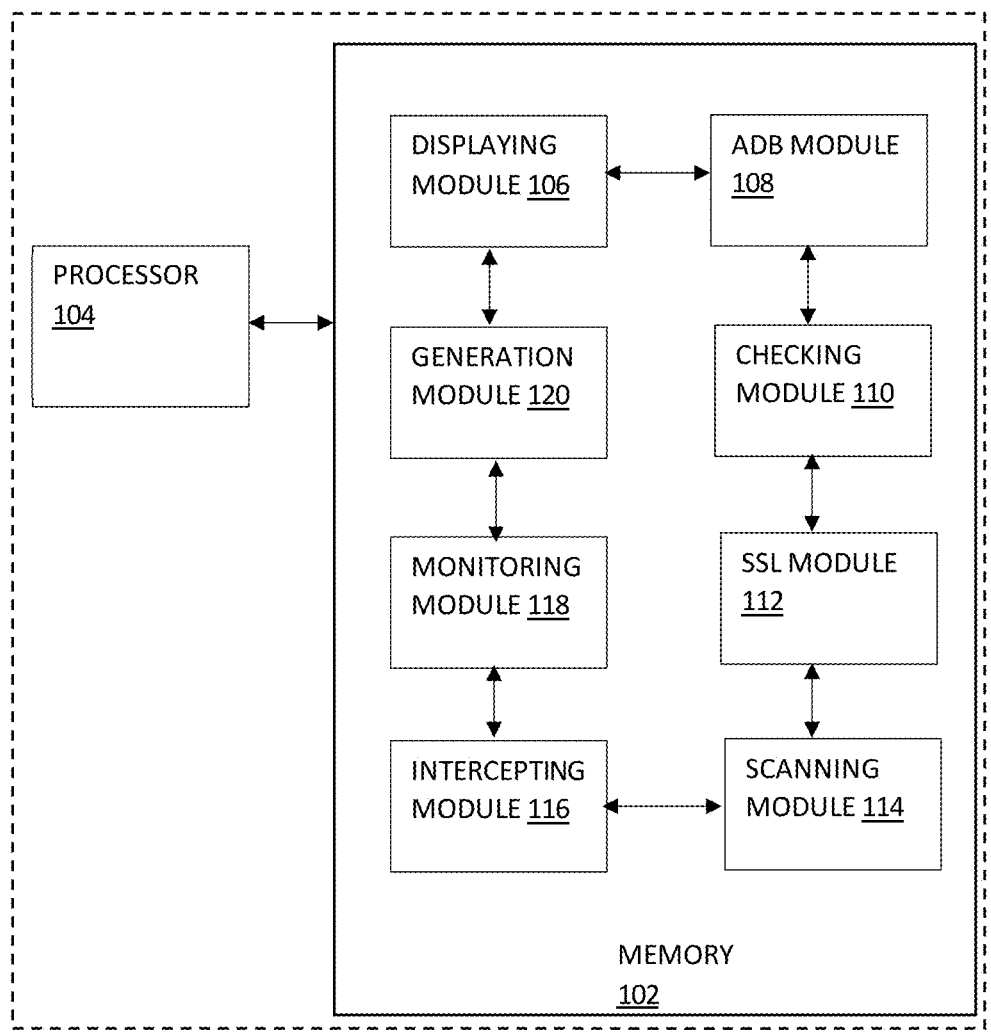
FIG. 1A illustrates an architectural block diagram of a system for testing and analyzing privacy of a mobile application, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The foregoing of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments of the present disclosure provide computer implemented method and a system to test and analyse security and privacy of a mobile application.

Although process steps, method steps or the like in the disclosure may be described in a sequential order, such processes and methods may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions(s), and does not imply that the illustrated process is preferred.

The term 'A Privacy Testing System' used herein can represent a computing system, such as a laptop, that includes an application to test and analyse privacy of at least one mobile application. Privacy testing system is a standalone software with no dependencies. However, it is part of a larger software which contains various modules including Privacy module, which is same as the invention Privacy testing system.

The term 'Mobile Application' used herein can represent a computer program or a software application designed to run on a mobile computing device such as mobile phones, tablets, smart watches, and the like. The said mobile application may be downloaded from digital application distribution platforms known as application stores (or app stores).

The term 'instrumentation agent' used herein represents an ability of a privacy testing system to monitor or alter the internal functionality of the application or measure the level of an application's performance and to diagnose errors.

The embodiments herein provide a system and a method for analyzing and testing privacy of at least one mobile application of a mobile device. The system is referred as a privacy testing system. The method for analyzing and testing privacy of at least one mobile application of the mobile device is executed by the privacy testing system embedded in the computing device. The method is configured to connect the mobile device to the system and user is enabled to select a target mobile application of which the privacy analysis and the testing is carried out. The method is configured to check the rooting status of the mobile device using ADB command line tool. ADB or Android Debug Bridge is used to establish connection between the device and the system. ADB helps us to fetch any sort of information from the device and convey to the system as required. ADB is also necessary to communicate with the device and make it act in any way we deem useful.

Further, the privacy testing system is configured to unpin any or all SSL pinning of the target mobile application. The privacy testing system is further configured to scan all encryptions and obfuscations used by the target application. Furthermore, the system is configured to intercept all http and http calls made by the target mobile application using reverse proxy setup and monitor all file access requests generated by the target mobile application. Based on above analysis, the system generates an analysis testing report of the target mobile application.

In one embodiment, the embodiments herein disclose a privacy testing system configured to test and analyse security and privacy of a mobile application.

The various embodiments with respect to methods and systems for analyzing interactions are described in FIG. 1 to FIG. 5.

FIG. 1A illustrates an architectural block diagram of a system for testing and analyzing privacy of a mobile application, according to an embodiment herein. A system for testing and analyzing privacy of a mobile application is provided. The system comprises a memory 102 for storing one or more executable modules and a processor 104 for executing the one or more executable modules for testing and analyzing privacy of a mobile application. The one or more executable modules comprises a displaying module 106, ADB module 108, checking module 110, SSL module 112, scanning module 114, intercepting module 116, monitoring module 118 and generation module 120. The displaying module 106 is used for displaying a list of a plurality of mobile devices connected to a privacy testing system and enabling a user to select a target mobile application for conducting privacy analysis and testing of the target mobile application. The ADB module 108 is used for checking if an android debug bridge (ADB) command line tool is enabled on the mobile device and root privileges of the mobile device upon ADB command line tool being available on the mobile device. The checking module 110 is used for checking if the mobile application is embedded with Secure Socket Layer (SSL) pinning. The SSL module 112 is used for employing an SSL unpinning process if the mobile application is embedded with SSL pinning. The scanning module 114 is used for scanning one or more encryptions and one or more obfuscations used by the target mobile application. The intercepting module 116 is used for intercepting hypertext transfer protocol (http) and one or more http calls made by the target mobile application. The monitoring module 118 is used for monitoring one or more file access requests generated by the target mobile application and the generation module 120 is used for generating an analysis testing report of the target mobile application. The ADB module 108 is further configured for saving a processor architecture type of the mobile device in the privacy testing system upon mobile device being rooted, selecting a native dynamic instrumentation binary based on the processor architecture type and pushing the native dynamic instrumentation binary to the mobile device, executing the instrumentation binary and initiating an instrumentation server, displaying a plurality of mobile applications included in the mobile device and selecting the target mobile application of the privacy is to be tested by the user and saving a software package name of the mobile application to be inserted in various stages of the method, wherein the package name is used as an identifier for the mobile application. The checking module 110 is further configured for patching the mobile application with a dynamic instrumentation agent if the mobile application is not embedded with SSL pinning, injecting a script inside the mobile application, setting up a reverse proxy between the mobile device and the server and initiating a monkey process on the mobile application or prompting user to provide manual inputs. The generation module 120 is further configured for saving one or more unique URLs and one or more application programming interface (API) endpoints in a memory, saving one or more encryptions and ciphering used during scanning for encryptions and obfuscations in the memory, saving a location of the file during monitoring one or more file access requests generated by the target mobile application, waiting for the completion of monkey process and stopping the code injection and sending a command from the system to the mobile device to stop the dynamic instrumentation server. The checking module 110 is further configured for requesting mobile device to send data to the server using android application, intercepting the request from the mobile device and response from server by the reverse proxy sitting between the mobile device and server, tracing the application programming interface (API) calls happening between the mobile device and respective server, hosting the reverse proxy on the system, wherein the proxy address provided by the system consists of an IP address and port and forcing the mobile device to connect to the same using android debug bridge (ADB) commands.

Figure 1B:
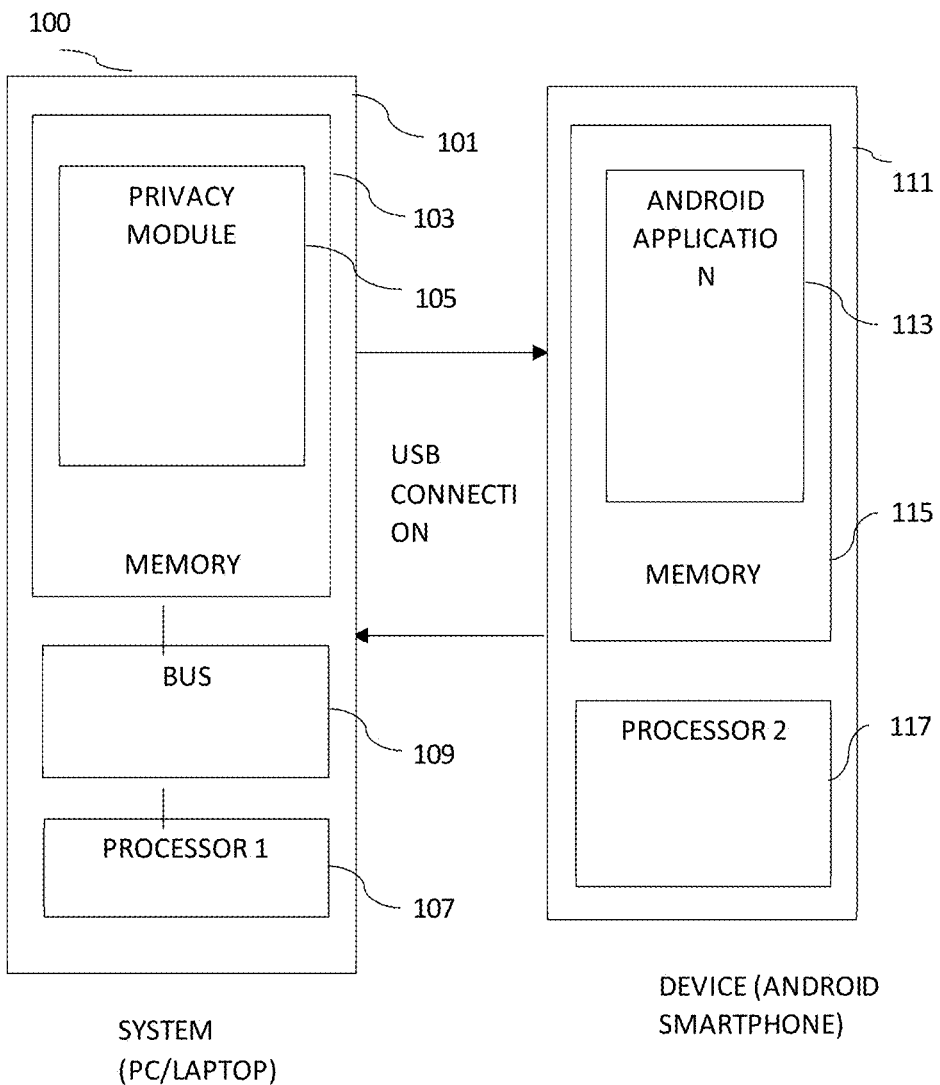
FIG. 1B illustrates an overview of an example environment including a privacy testing system for testing and analyzing privacy of a mobile application, according to an embodiment herein.
Figure 2A:
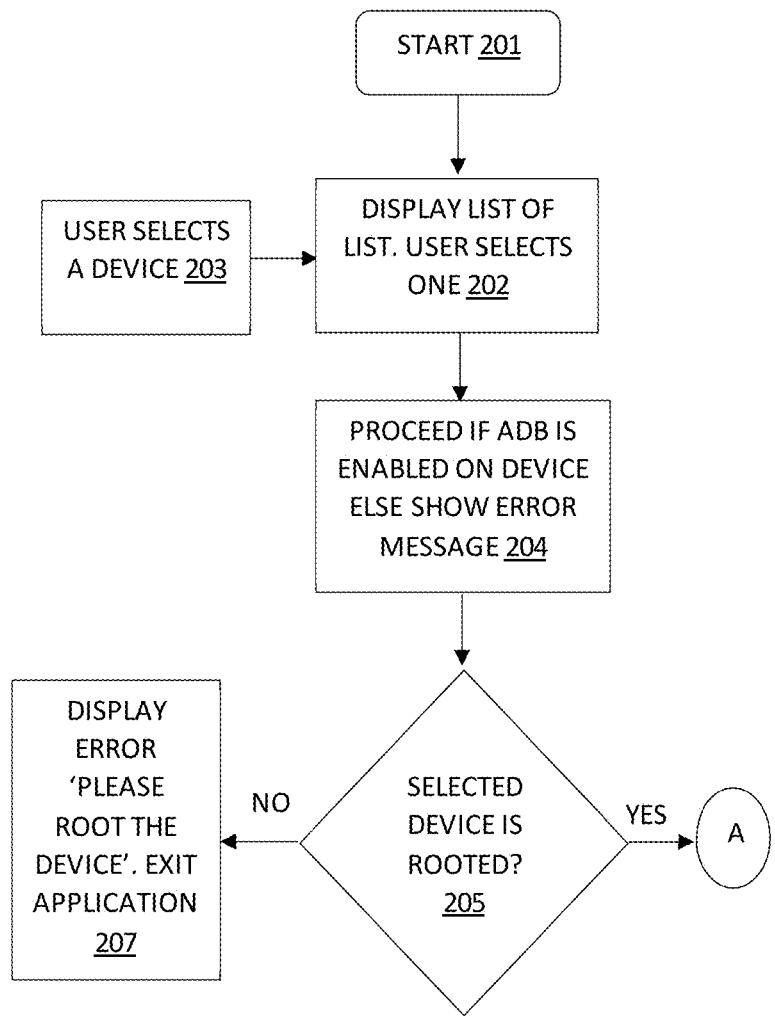
FIG. 2A-2E illustrates a flowchart of a method for testing and analyzing privacy of a mobile application, according to an embodiment herein.
Figure 2B:
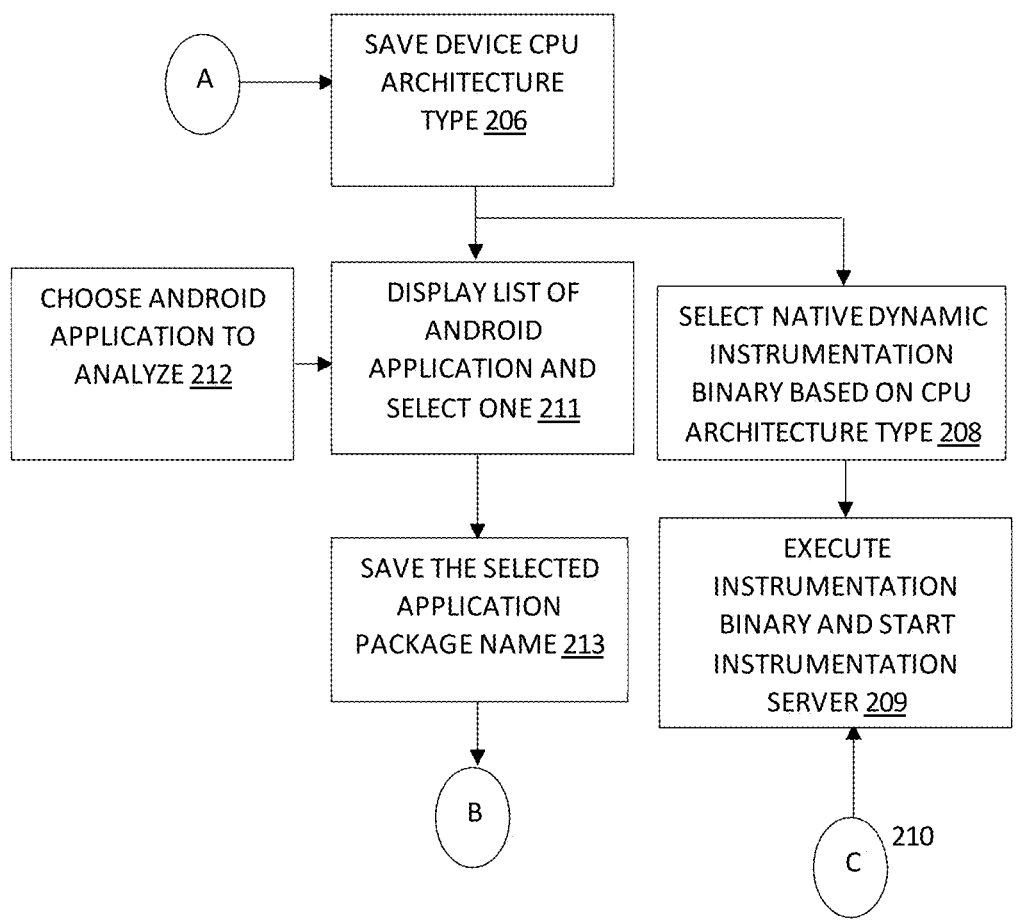
Figure 2C:
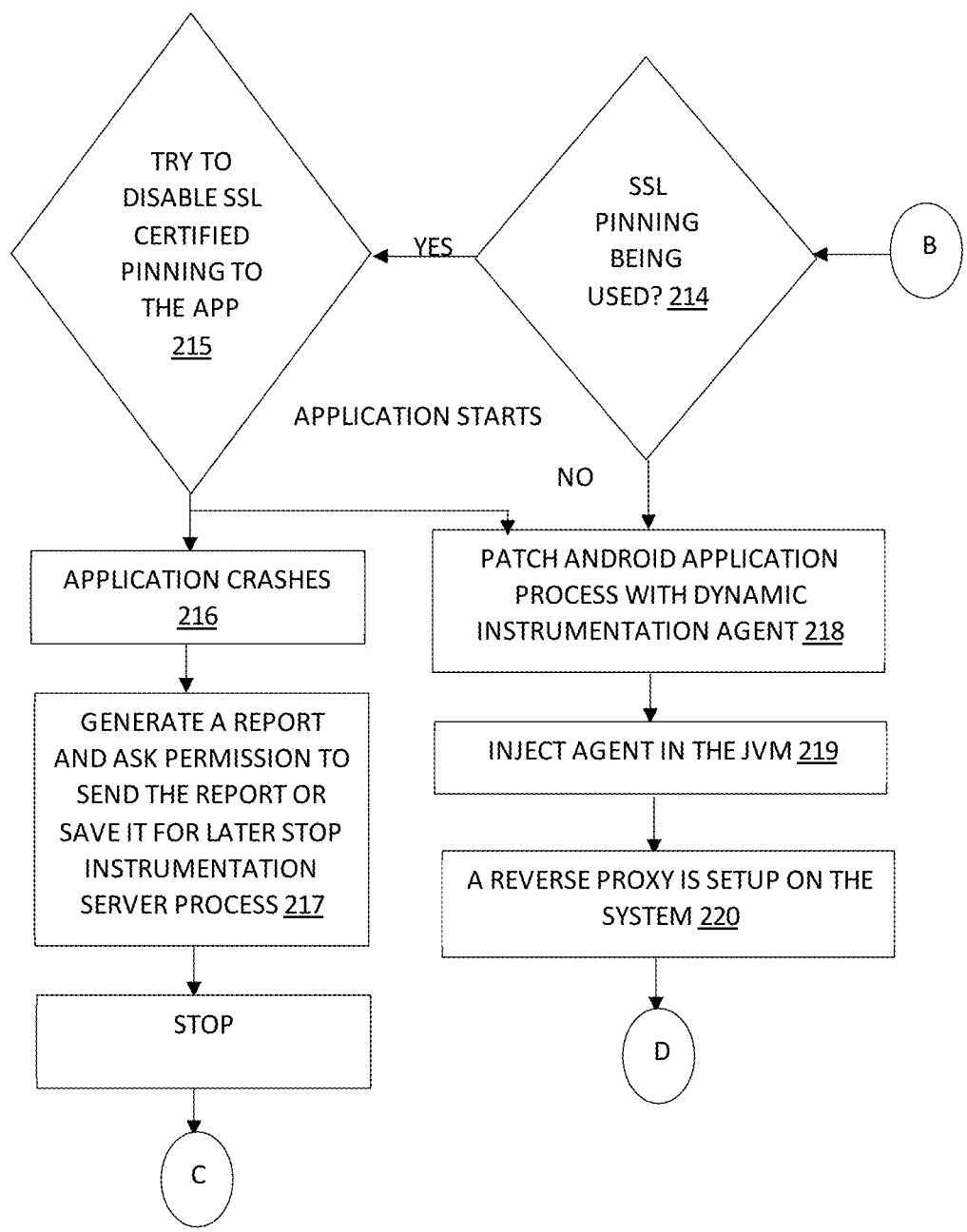
Figure 2D:
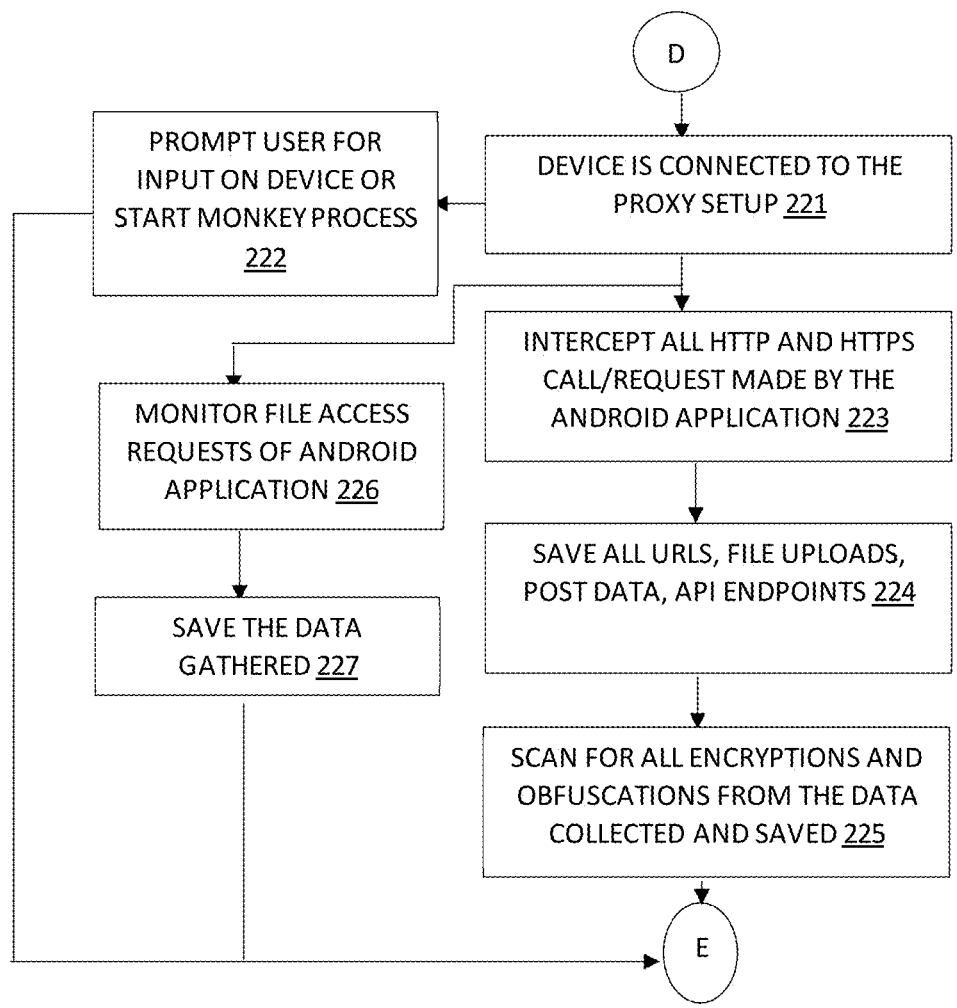
Figure 2E:
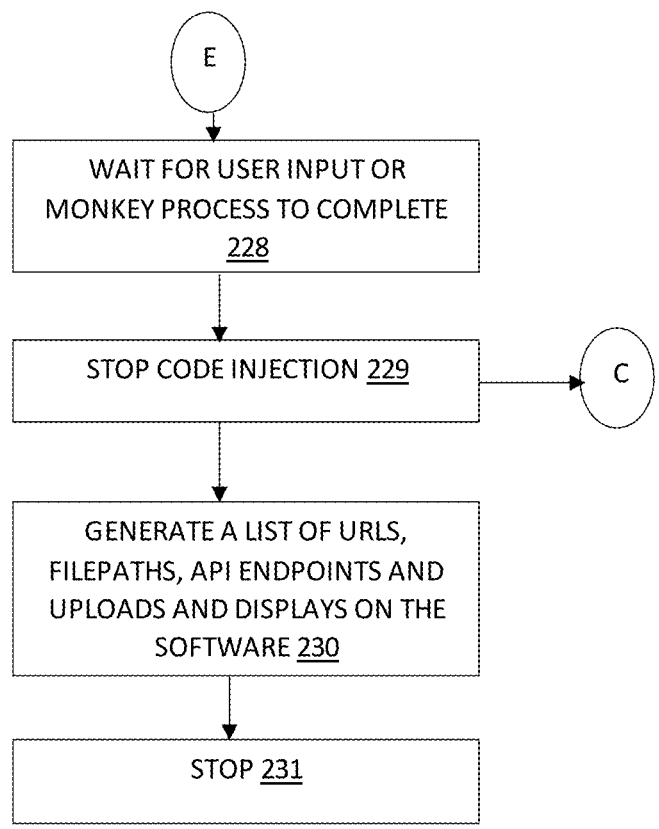

FIG. 1B illustrates an overview of an example environment 100 including a privacy testing system 101 for testing and analyzing privacy of a mobile application 113, according to an embodiment herein. The environment 100 includes a user device 111 of a mobile user and the privacy testing system 101 hosted on a computing device. The computing device is an electronic device, for example, one or more of a personal computer, a tablet computing device, a mobile computer, a smart phone, a portable computing device, a laptop, a wearable computing device such as smart glasses, smart watches, etc., a touch centric device, a workstation, a server, a client device, a portable electronic device, a network-enabled computing device, an interactive network-enabled communication device, a gaming device, an image capture device, a web browser, a portable media player, a video recorder, any other suitable computing equipment or combinations of multiple pieces of computing equipment.

Various aspects of the embodiments herein may be embodied as a system, a method, or a non-transitory, computer-readable storage medium having one or more computer-readable program codes stored thereon. Accordingly, various embodiments herein may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". As used herein, "non-transitory, computer-readable storage medium" refers to all computer-readable storage media that contains and stores computer programs and data. Examples of the computer-readable media comprise hard drives, solid state drives, optical discs or magnetic disks, memory chips, a read-only memory (ROM), a register memory, a processor cache, a random-access memory (RAM), etc.

The privacy testing system 101 further comprises at least one processor1 107 and a non-transitory, computer-readable storage medium, for example, a memory 103, for storing computer program instructions defined by a privacy module 105 of the privacy testing system 101. The memory 103 is used for storing program instructions, applications, and data. The memory 103 is, for example, a random-access memory (RAM) or another type of dynamic storage device that stores information and instructions for execution by the processor1 107. The memory 103 also stores temporary variables and other intermediate information used during execution of the instructions by the processor1 107. The computing device further comprises read only memories (ROMs) or other types of static storage devices that store static information and instructions for execution by the processor1 107. In an embodiment, the privacy module 105 is stored in the memory 103 as illustrated in FIG. 1. The privacy testing system 101, As illustrated in FIG. 1, further comprises a data bus 109. The data bus 109 permits communications between the privacy module 105 and the processor1 107.

The privacy testing system 101 is configured to establishes data communication with the mobile device 111. In one embodiment, the data communication is established through a Universal Serial Bus (USB) cable based on Android Debug Bridge (ADB) command line tool. The mobile device 111 is configured with a mobile application 113. In an exemplary embodiment, the mobile application 113 is the target application of which the privacy is tested through the privacy testing system 101. The mobile device 111 comprises at least one processor2 117 and a non-transitory, computer-readable storage medium, for example, a memory 115, for storing computer program instructions defined by the mobile application 113 of the mobile device 111. The memory 115 is used for storing program instructions, applications, and data. The memory 115 is, for example, a random-access memory (RAM) or another type of dynamic storage device that stores information and instructions for execution by the processor2 117. The memory 115 also stores temporary variables and other intermediate information used during execution of the instructions by the processor2 117. The mobile application 113 is stored in the memory 115.

Further, the environment 100 describes the system 101 that may be embodied within a server (not shown in the FIG) or may be a standalone component, associated with the server. The system 101 is configured to host and manage the privacy module 105 In another embodiment, the mobile application 113 is made available at application stores such as Google play store managed by Google®, Apple app store managed by Apple®, etc., and are downloadable from the application stores to be accessed on devices such as the mobile device 111. In some alternate embodiments, the application 113 may be pre-installed on the devices 111 as per the factory settings.

Some examples of a method for testing and analyzing privacy of a mobile application with reference to FIG. 2A-2E.

FIG. 2A-2E illustrates a flowchart of a method for testing and analyzing privacy of a mobile application, according to an embodiment herein. The method disclosed herein employs the privacy testing system for testing and analyzing privacy of a mobile application. In the method disclosed herein, the privacy testing system communicates with the mobile device 111 to test a target mobile application on the mobile device 111. On invoking the privacy testing system by launching the privacy module (shown in FIG. 1) on the privacy testing system, the privacy testing system initiates the privacy testing method. In one embodiment, at 201, the privacy testing system displays a list of mobile devices that are connected to the privacy testing system through, in one example, a USB cable. At 202, a user selects a target mobile device 111. In one embodiment, the privacy testing system may check if the use of ADB command line tool is enabled on the device i.e., USB Debugging must be enabled. If yes, the method will proceed to next step; if not, the privacy testing system displays an error message indicating failed data communication connection between the privacy testing system and the mobile device 111. Further, the privacy testing system checks if the mobile device is rooted wherein the rooting is performed to overcome limitations that carriers and hardware manufacturers put on the mobile device 111. Thus, rooting gives the ability to alter or replace mobile application and settings, run specialized applications that require administrator-level permissions or perform other operations that are otherwise inaccessible to a normal user. If the mobile device 111 is rooted, then the privacy testing system carries with the further steps. If the mobile device 111 is not rooted, then the privacy testing system displays an error message such as 'Please root the mobile device'.

Further, according to FIG. 2A-2E, after the user selects the mobile device 111, the privacy testing system saves processor architecture type of the mobile device 111. In one embodiment, the privacy testing system is configured to collect information on the processor architecture type such as, in one example, arm7a, arm8a etc. of the mobile device 111 for feeding a code injection tool. The file to be used for the code injection is selected based on the processor architecture type. Simultaneously, the method includes selection of native dynamic instrumentation based on the processor architecture and is pushed to the mobile device 111. In one embodiment, native dynamic instrumentation is the process of modifying the instructions of a binary program of the mobile device while it executes. This technique is used in a wide variety of software engineering domains such as performance analysis, reverse engineering, program optimization and quality assurance. The method includes execution of the instrumentation binary and start instrumentation server. In one embodiment, once the application testing is completed, the server running on the mobile device 111 is required to be stopped to avoid crashes and/or misbehaviour of the mobile application. In one example, a command is sent from the privacy testing system to the mobile device 111 to stop the dynamic instrumentation server. For example, Frida is a dynamic instrumentation toolkit which works on the code injection technique. Dynamic instrumentation is when you can change the behaviour of an application during runtime. E.g., An Android application is being executed on a device for which source code is packaged and we are unaware of the source code, now code injection means we inject our own small code snippet inside application/source code while the Android application is running. This code snippet is known as dynamic instrumentation agent and can modify the behaviour of the application according to the use.

For Frida code injection to work, certain prerequisites are required. We need an instrumentation binary provided by Frida to inject code in the runtime memory. These instrumentation binaries vary according to the architecture of the CPU present in device. We need to copy the binary onto the device using ADB. Also, the binary must be given the proper permissions for it to be executable. FYI, binary is an executable code package for the machine. Finally, we need to execute the copied binary on device and the instrumentation binary start the instrumentation server on the Android device.

The privacy testing system displays all mobile applications included in the mobile device 111. The user may select a target mobile application of which the privacy is tested. Once the mobile application is selected, the software package name of the application is saved to be inserted in various stages throughout the process of testing and analyzing the mobile application and the package name is used as an identifier for the mobile application. Privacy analysis starts.

The privacy testing system is configured to check if the mobile application is embedded with Secure Socket Layer (SSL) pinning. In order to check the SSL pinning, the system is configured to use an encryption and obfuscation identifying library to determine the encryptions and obfuscations used in the mobile application. In one exemplary embodiment, the process of determining the encryptions and obfuscations of various mobile applications available on the application stores has been carried out, especially on the latest versions of the mobile applications to automate and quicken the analysis and testing process. With the information gained, we inject a script written in JavaScript language for SSL unpinning. There are different SSL Pinning methods available on the market and dynamic instrumentation can be used to disable almost all of them. But sometimes the implementation is obfuscated to prevent this. In one embodiment, the SSL pinning is a process of associating a host of the mobile application with the expected X509 certificate or a public key. If the mobile application is embedded with Secure Socket Layer (SSL) pinning, the privacy testing system is configured to try SSL Unpinning (FIG. 2 (15)).

Figure 3:
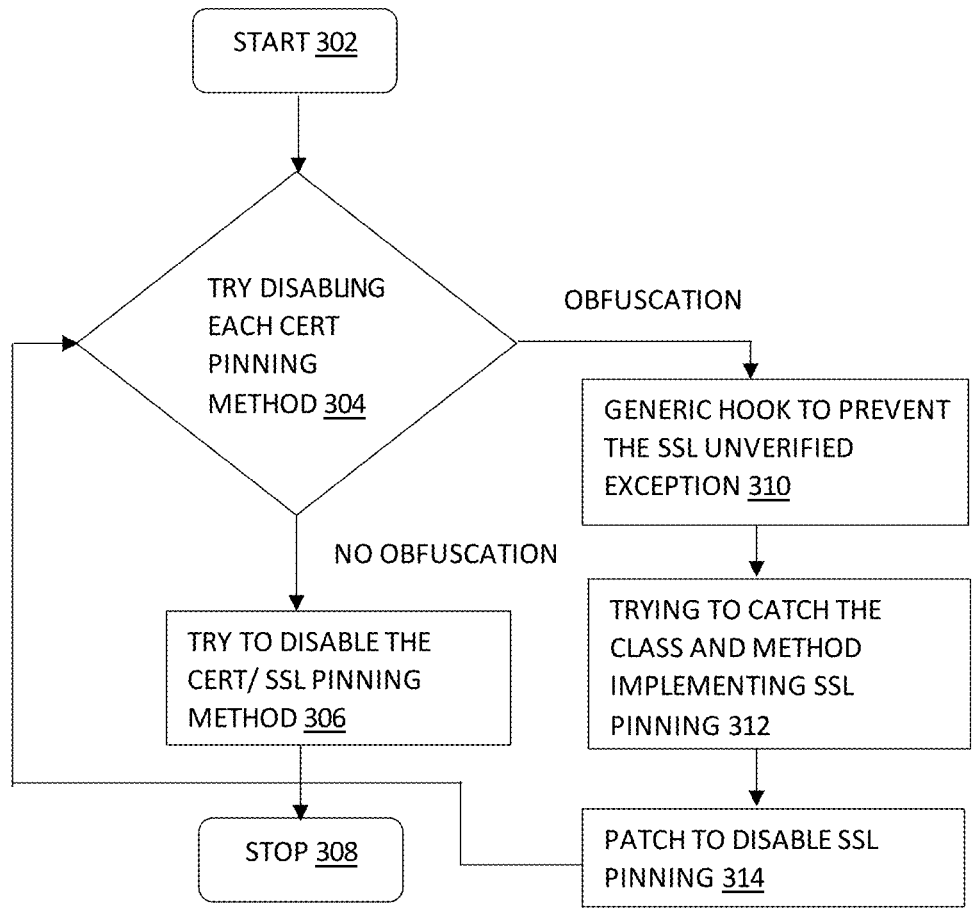
FIG. 3 illustrates a flowchart representing a method to disable each SSL Pinning Certificates employed by the application.

FIG. 3 illustrates a chart showcasing the SSL unpinning method used. In case of direct implementation i.e., without any obfuscation, we try disabling the SSL pinning by hooking into the classes implementing the cert/certificate/SSL Pinning. e.g., OkHttp, OkHttp3, TrustManagerImpl (Android>7). In case of obfuscation, the application is monitored for any SSL un verified error or exception. The class or class method generating the error must be implementing the SSL Pinning, then our SSL unpinning agent tries to disable SSL pinning by using the information gained above, we log an error if we are unable to disable it.

Further, if the mobile application is not embedded with Secure Socket Layer (SSL) pinning, the privacy testing system, at FIG. 2 (18), is configured to patch the mobile application with the dynamic instrumentation agent. In one embodiment, patching enables the privacy testing system to modify the application behaviour in order to make the application behave the way required by the system. The dynamic instrumentation server enables the system to attach and inject a script inside the application. In one example, a python script is executed on the system which uses the dynamic instrumentation server running on an Android device which helps the system hook into the android application using a JavaScript snippet i.e., dynamic instrumentation agent.

As per FIG. 2 (16), if none of the SSL unpinning methods works or the target application crashes multiple times while trying the same, the privacy testing system proceeds to generate a report of the issues and errors faced while execution of all or any the unpinning methods. In one embodiment, the privacy testing system prompts users to permit to send the report to Application programming interface of the privacy testing system. Additionally, after patching the mobile application with the dynamic instrumentation agent, the privacy testing system to generate an analysis test report which is described in FIG. 2 (22-28).

After successfully injecting the JavaScript dynamic instrumentation agent into the memory. A reverse proxy is setup between the device (client) and the server. Our Android application acts as client sending requests to the server for data or sending data. The reverse proxy sits between the client and server and intercepts the request from client and response from server. Using this, we trace the API calls happening between the client (application) and its respective server. The reverse proxy is hosted on the system where invention is present. The proxy address which our system provides consists of an IP address and port. The device is forced to connect to the same using ADB commands. FIG. 2 (19,20).

FIG. 2 (22-28) further illustrates a flowchart of an additional method for testing and analyzing privacy of a mobile application to generate an analysis test report, according to an embodiment herein. At 501, after patching the mobile application with the dynamic instrumentation agent, inject the instrumentation agent into the virtual machine and initiate a Monkey process on the mobile application or prompt the user to provide manual inputs. In an exemplary embodiment, the virtual machine is a Java virtual machine that enables the privacy testing system to run Java programs as well as programs written in other languages that are also compiled to Java bytecode. In one embodiment, after the successful injection of the instrumentation agent into the mobile application, the monkey process on the mobile application is initiated or manual input starts. The monkey process is edited in a way to test most possible uses of the mobile application. In one embodiment, increasing the timing of the monkey process will generate a more comprehensive output. Coverage of all the functionalities of the application through manual inputs will also generate a more comprehensive output. The monkey process is an inbuilt tool present along the Android OS. It is initiated and terminated using ADB from a system (PC). It can be changed or modified to simulate consecutive taps, swipes, and various other hardware inputs to the device for a certain application package. It is useful to find any hidden bugs or crashes. Further, it can be used to generate random inputs on an application without any manual interference. Therefore, monkey process in the context of invention is used to give random inputs to the application under testing to ensure the coverage of maximum scenarios.

The privacy testing system is configured to scan for encryptions and obfuscations used by the mobile application. In one embodiment, privacy testing system uses a node library to list out all the encryptions and obfuscations used in the mobile application, while the application runs dynamically. The privacy testing system is configured to save all the encryptions and ciphering used during the scanning for encryptions and obfuscations in the system memory. The privacy testing system is configured to intercept all http and https requests made by the mobile application. In one embodiment, the privacy testing system, using a man in the middle attack, intercepts all the https and http requests issued by the application while the application is in use. In one embodiment, the man in the middle attack is executed through a reverse proxy server. The privacy testing system is configured to save all the unique URLs and API endpoints in the system memory. The privacy testing system is configured to monitor all or any files access requests from the mobile application. In embodiment, the instrumentation agent injected monitors the application memory during access of any and all file on system memory. The privacy testing system is configured to save the location of the file. The saving is done by tracing the different classes and methods present on the application. The system awaits the completion of Monkey process or user input, and the system is configured to stop the code injection. In one embodiment, a command is sent from the system to the mobile device to stop the dynamic instrumentation server as described in step of FIG. 2. In one example, python script hooking in the application is stopped which stops the code injection. The system is configured to generate an analysis test report and display the same to the user of the mobile application. In one embodiment, the system gathers all the data gathered in FIG. 2 and FIG. 3 and is categorically arranged and displayed.

Figure 4A:
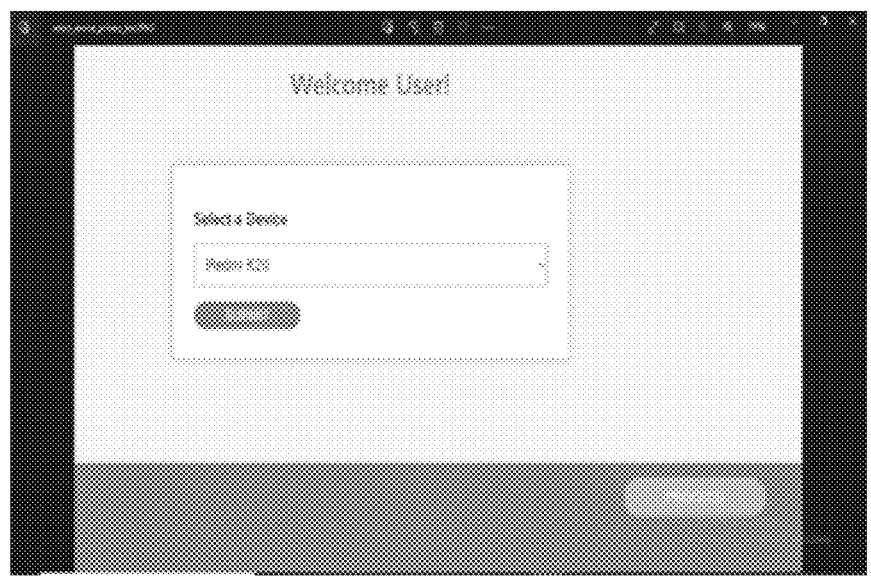
FIG. 4A-4B illustrates a screen shot for the user selecting the device and privacy module, according to an embodiment herein.
Figure 4B:
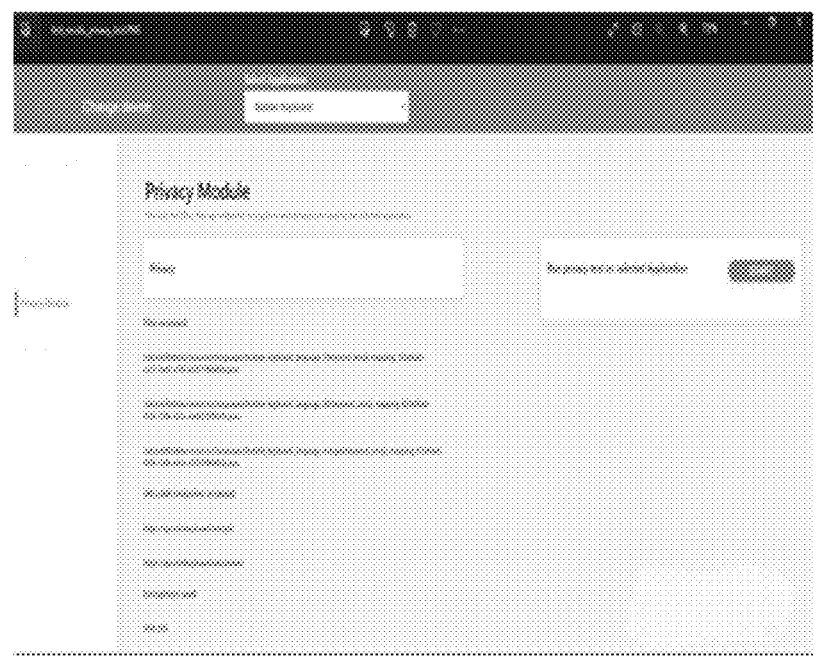

FIG. 4A-4B illustrates exemplary scenario of the user selecting the device and privacy module, according to an embodiment herein. The system 101 is configured to host and manage the privacy module 105. In one embodiment, the privacy module 105 may be installed in a computing device, such as a mobile device, laptop, desktop, and the like.

Figure 5A:
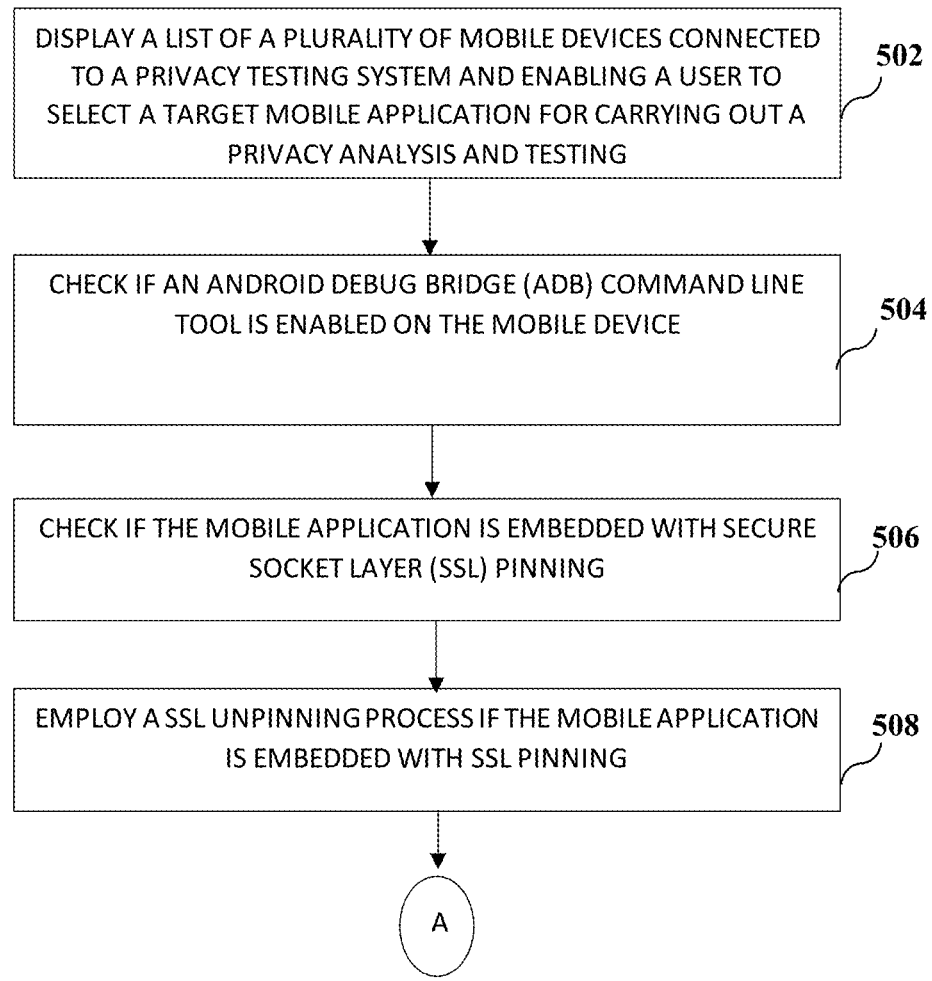
FIGS. 5A-5B illustrates a flow diagram of a method for testing and analyzing privacy of a mobile application, according to an embodiment herein.
Figure 5B:
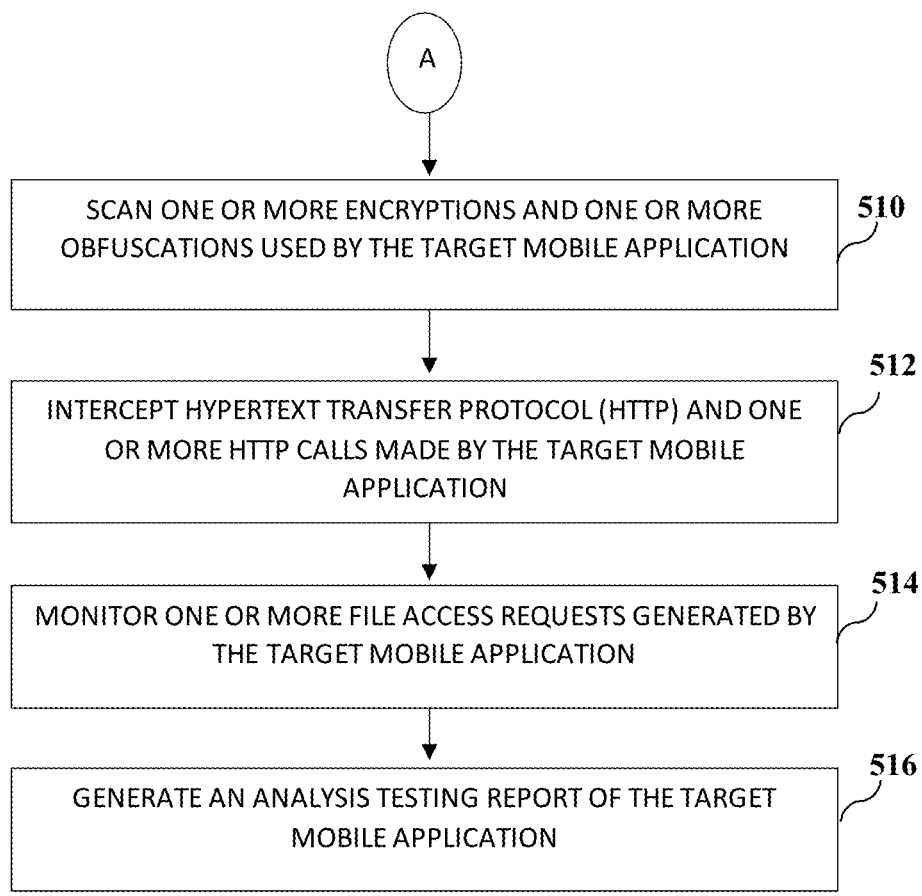

FIGS. 5A-5B illustrates a flow diagram of a method for testing and analyzing privacy of a mobile application, according to an embodiment herein. At step 502, a list of a plurality of mobile devices connected to a privacy testing system is displayed and enabling a user to select a target mobile application for carrying out a privacy analysis and testing. At step 504, it is checked if an android debug bridge (ADB) command line tool is enabled on the mobile device and root privileges of the mobile device upon ADB command line tool being available on the mobile device. At step 506, it is checked if the mobile application is embedded with Secure Socket Layer (SSL) pinning. At step 508, an SSL unpinning process is employed if the mobile application is embedded with SSL pinning. At step 510, one or more encryptions and one or more obfuscations are scanned that used by the target mobile application. At step 512, intercepting hypertext transfer protocol (http) and one or more http calls made by the target mobile application are intercepted. At step 514, one or more file access requests are monitored that generated by the target mobile application. At step 516, an analysis testing report of the target mobile application is generated.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. The computer program codes comprising computer readable and executable instructions can be implemented in any programming language. In an embodiment, the computer program code or software programs are stored on or in one or more mediums as object code. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

The detailed description of various exemplary embodiments of the disclosure is described herein with reference to the accompanying drawings. It should be noted that the embodiments are described herein in such details as to clearly communicate the disclosure. However, the details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternatives falling within the scope of the disclosure.

The embodiments herein provide a system and a method for analyzing and testing privacy of a mobile application. The embodiments herein disclose a tool for fully automated privacy testing of Mobile Applications, especially for testing of Android Application. The embodiments herein automate the process of privacy testing by overcoming the disadvantage of existing methods wherein according to the existing methods, each step of privacy testing is manually executed. Thus, the embodiments herein provide a comprehensive output for all the major mobile applications by reducing manual effort required to test the privacy of the application to nil.

The foregoing examples and illustrative implementations of various embodiments have been provided merely for explanation and are in no way to be construed as limiting of the embodiments herein. While the embodiments herein have been described with reference to various embodiments, illustrative implementations, drawings, and techniques, it is understood that the words, which have been used herein, are words of description and illustration, rather than words of limitation. Further, although the embodiments herein have been described herein with reference to particular means, materials, embodiments, techniques, and implementations, the embodiments herein is not intended to be limited to the particulars disclosed herein; rather, the embodiments herein extends to all functionally equivalent structures, methods and uses, such as are within the scope of the appended claims. It will be understood by those skilled in the art, having the benefit of the teachings of this specification that the embodiments herein is capable of modifications and other embodiments may be affected and changes may be made thereto, without departing from the scope and spirit of the embodiments herein.

It is to be understood, that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A method for testing and analyzing privacy of a mobile application, the method comprising:
    displaying a list of a plurality of mobile devices connected to a privacy testing system and enabling a user to select a target mobile application for carrying out a privacy analysis and testing;
    checking if an android debug bridge (ADB) command line tool is enabled on a mobile device of the plurality of mobile devices and root privileges of the mobile device upon the ADB command line tool is enabled on the mobile device, wherein the checking of the root privileges further comprises:
        saving a processor architecture type of the mobile device in the privacy testing system upon the mobile device being rooted;
        selecting a native dynamic instrumentation binary based on the processor architecture type and pushing the native dynamic instrumentation binary to the mobile device;
        executing the native dynamic instrumentation binary and initiating an instrumentation server;
        displaying a plurality of mobile applications included in the mobile device and selecting the target mobile application in which the privacy is to be tested by the user; and
        saving a software package name of the mobile application to be inserted in various stages of the method, wherein the package name is used as an identifier for the mobile application;
    checking if the mobile application is embedded with Secure Socket Layer (SSL) pinning;
    employing an SSL unpinning process if the mobile application is embedded with the SSL pinning;
    scanning one or more encryptions and one or more obfuscations used by the target mobile application;
    intercepting a hypertext transfer protocol (http) and one or more http calls made by the target mobile application;
    monitoring one or more file access requests generated by the target mobile application; and
    generating an analysis testing report of the target mobile application.

2. The method as claimed in claim 1, wherein checking if the mobile application is embedded with the SSL pinning further comprises:
    patching the mobile application with a dynamic instrumentation agent if the mobile application is not embedded with the SSL pinning;
    injecting a script inside the mobile application;
    setting up a reverse proxy between the mobile device and the instrumentation server; and
    initiating a monkey process on the mobile application or prompting the user to provide manual inputs.

3. The method as claimed in claim 1, further comprising generating a report of issues and errors faced during execution of the unpinning methods if none of the SSL unpinning methods works, or the target application crashes multiple times while trying the same.

4. The method as claimed in claim 1, wherein generating the analysis testing report of the target mobile application further comprises:
   saving one or more unique URLs and one or more application programming interface endpoints in a memory;
   saving one or more encryptions and ciphering used during scanning for encryptions and obfuscations in the memory;
   saving a location of the file during monitoring one or more file access requests generated by the target mobile application;
   waiting for the completion of monkey process and stopping code injection; and
   sending a command from the privacy testing system to the mobile device to stop the instrumentation server.

5. The method as claimed in claim 1, wherein the SSL unpinning process further comprises:
   disabling the SSL pinning by hooking into the classes implementing one of the: cert/certificate/SSL pinning upon direct implementation or without obfuscation;
   preventing the SSL unverified exception using generic hook in case of obfuscation;
   trying to catch the class and method implementing the SSL pinning; and
   patching to disable the SSL pinning.

6. The method as claimed in claim 1, wherein the native dynamic instrumentation is a process of modifying instructions of a binary program of the mobile device while it executes.

7. The method as claimed in claim 1, wherein the step of checking the SSL pinning further comprising identifying library to determine encryptions and obfuscations used in the mobile application.

8. The method as claimed in claim 2, wherein setting up-a reverse proxy between the mobile device and the instrumentation server further comprises:
   hosting the reverse proxy on the privacy testing system, wherein a proxy address provided by the privacy testing system consists of an IP address and port; and
   forcing the mobile device to connect to the same using android debug bridge (ADB) commands;
   requesting the mobile device to send data to the instrumentation server using android application;
   intercepting the request from the mobile device and response from the instrumentation server by the reverse proxy sitting between the mobile device and the instrumentation server; and
   tracing the application programming interface (API) calls happening between the mobile device and a respective server.

9. A system for testing and analyzing privacy of a mobile application, the system comprising:
   a memory for storing one or more executable modules; and
   a processor for executing the one or more executable modules for phonetic-based transliteration, the one or more executable modules comprising:
   a displaying module for displaying a list of a plurality of mobile devices connected to a privacy testing system and enabling a user to select a target mobile application for conducting privacy analysis and testing of the target mobile application;
   a ADB module for checking if an android debug bridge command line tool is enabled on a mobile device of the plurality of mobile devices, wherein the ADB module is further configured for:
      saving a processor architecture type of the mobile device in the privacy testing system upon the mobile device being rooted;
      selecting a native dynamic instrumentation binary based on the processor architecture type and pushing the native dynamic instrumentation binary to the mobile device;
      executing the native dynamic instrumentation binary and initiating an instrumentation server;
      displaying a plurality of mobile applications included in the mobile device and selecting the target mobile application in which the privacy is to be tested by the user; and
      saving a software package name of the mobile application to be inserted in various stages of the method, wherein the package name is used as an identifier for the mobile application;
   a checking module for checking if the mobile application is embedded with Secure Socket Layer pinning;
   an SSL module for employing an SSL unpinning process if the mobile application is embedded with the SSL pinning;
   a scanning module for scanning one or more encryptions and one or more obfuscations used by the target mobile application;
   an intercepting module for intercepting a hypertext transfer protocol and one or more http calls made by the target mobile application;
   a monitoring module for monitoring one or more file access requests generated by the target mobile application; and
   a generation module for generating an analysis testing report of the target mobile application.

10. The system as claimed in claim 9, wherein the checking module is further configured for:
   patching the mobile application with a dynamic instrumentation agent if the mobile application is not embedded with the SSL pinning;
   injecting a script inside the mobile application;
   setting up a reverse proxy between the mobile device and the instrumentation server; and
   initiating a monkey process on the mobile application or prompting the user to provide manual inputs.

11. The system as claimed in claim 9, further comprising generating a report of issues and errors faced during execution of the unpinning methods if none of the SSL un-pinning methods works, or the target application crashes multiple times while trying the same.

12. The system as claimed in claim 9, wherein the generation module is further configured for:
   saving one or more unique URLs and one or more application programming interface endpoints in a memory;
   saving one or more encryptions and ciphering used during scanning for encryptions and obfuscations in the memory;
   saving a location of the file during monitoring one or more file access requests generated by the target mobile application;
   waiting for the completion of monkey process and stopping code injection; and
   sending a command from the privacy testing system to the mobile device to stop the instrumentation server.

13. The system as claimed in claim 9, wherein the SSL unpinning method further comprises:
- disabling the SSL pinning by hooking into the classes implementing one of the: cert/certificate/SSL pinning upon direct implementation or without obfuscation;
- preventing the SSL unverified exception using generic hook in case of obfuscation;
- trying to catch the class and method implementing the SSL pinning; and
- patching to disable the SSL pinning.

14. The system as claimed in claim 9, wherein the native dynamic instrumentation is a process of modifying instructions of a binary program of the mobile device while it executes.

15. The system as claimed in claim 9, wherein to check the SSL pinning, the system is configured to use an encryption and obfuscation identifying library to determine the encryptions and obfuscations used in the mobile application.

16. The system as claimed in claim 9, wherein the checking module is further configured for:
- hosting a reverse proxy on the system, wherein a proxy address provided by the system consists of an IP address and port; and
- forcing the mobile device to connect to the same using android debug bridge (ADB) commands;
- requesting the mobile device to send data to the instrumentation server using android application;
- intercepting the request from the mobile device and response from the instrumentation server by the reverse proxy sitting between the mobile device and the instrumentation server; and
- tracing the application programming interface (API) calls happening between the mobile device and a respective server.

17. A method for testing and analyzing privacy of a mobile application, the method comprising:
- displaying a list of a plurality of mobile devices connected to a privacy testing system and enabling a user to select a target mobile application for carrying out a privacy analysis and testing;
- checking if an android debug bridge (ADB) command line tool is enabled on a mobile device of the plurality of mobile devices and root privileges of the mobile device upon the ADB command line tool is enabled on the mobile device;
- checking if the mobile application is embedded with Secure Socket Layer (SSL) pinning;
- employing an SSL unpinning process if the mobile application is embedded with the SSL pinning;
- scanning one or more encryptions and one or more obfuscations used by the target mobile application;
- intercepting a hypertext transfer protocol (http) and one or more http calls made by the target mobile application;
- monitoring one or more file access requests generated by the target mobile application; and
- generating an analysis testing report of the target mobile application, wherein generating the analysis testing report of the target mobile application further comprising:
  - saving one or more unique URLs and one or more application programming interface (API) endpoints in a memory;
  - saving one or more encryptions and ciphering used during scanning for encryptions and obfuscations in the memory;
  - saving a location of the file during monitoring one or more file access requests generated by the target mobile application;
  - waiting for the completion of monkey process and stopping code injection; and
  - sending a command from the privacy testing system to the mobile device to stop the instrumentation server.

18. A method for testing and analyzing privacy of a mobile application, the method comprising:
- displaying a list of a plurality of mobile devices connected to a privacy testing system and enabling a user to select a target mobile application for carrying out a privacy analysis and testing;
- checking if an android debug bridge (ADB) command line tool is enabled on a mobile device of the plurality of mobile devices and root privileges of the mobile device upon the ADB command line tool is enabled on the mobile device;
- checking if the mobile application is embedded with Secure Socket Layer (SSL) pinning; employing an SSL unpinning process if the mobile application is embedded with the SSL pinning, wherein the SSL unpinning process further comprising:
  - disabling the SSL pinning by hooking into the classes implementing one of the: cert/certificate/SSL pinning upon direct implementation or without obfuscation;
  - preventing the SSL unverified exception using generic hook in case of obfuscation;
    - trying to catch the class and method implementing the SSL pinning; and patching to disable the SSL pinning;
- scanning one or more encryptions and one or more obfuscations used by the target mobile application;
- intercepting a hypertext transfer protocol (http) and one or more http calls made by the target mobile application;
- monitoring one or more file access requests generated by the target mobile application; and
- generating an analysis testing report of the target mobile application.

\* \* \* \* \*